United States Patent
Lin et al.

(10) Patent No.: US 8,624,539 B2
(45) Date of Patent: Jan. 7, 2014

(54) START-UP CIRCUIT AND MOTOR DRIVING IC

(75) Inventors: Ying-Chen Lin, Taichung (TW);
Kun-Min Chen, Changhua County (TW); Ching-Sheng Li, Hsinchu County (TW); Chia-Tai Yang, Tainan (TW); Ching-Shan Lu, Kaohsiung (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 259 days.

(21) Appl. No.: 13/204,732

(22) Filed: Aug. 8, 2011

(65) Prior Publication Data
US 2012/0280642 A1   Nov. 8, 2012

(30) Foreign Application Priority Data
May 4, 2011   (TW) .................................. 100115651

(51) Int. Cl.
*G05B 11/28*   (2006.01)
(52) U.S. Cl.
USPC ....................... 318/599; 318/400.11; 318/272

(58) Field of Classification Search
USPC .......... 318/599, 400.11, 272, 400.12, 400.07, 318/400.06, 268
See application file for complete search history.

(56) References Cited

U.S. PATENT DOCUMENTS 7,598,690 B2 *   10/2009   Yang et al. ................. 318/254.1

FOREIGN PATENT DOCUMENTS

| TW | 200906050 | 2/2009 |
| TW | 201104992 | 2/2011 |

* cited by examiner

*Primary Examiner* — Karen Masih
(74) *Attorney, Agent, or Firm* — Winston Hsu; Scott Margo

(57) ABSTRACT

The present invention discloses a start-up circuit for a motor driving IC. The activation circuit includes a determination unit, for generating a determination result indicating an operating mode of the motor driving IC according to an external pulse width modulation signal, and an output unit, for outputting an activation signal according to the determination result and a pulse width modulation activation signal. A duty of the pulse width modulation activation signal is greater than a duty of the external pulse width modulation signal.

16 Claims, 9 Drawing Sheets

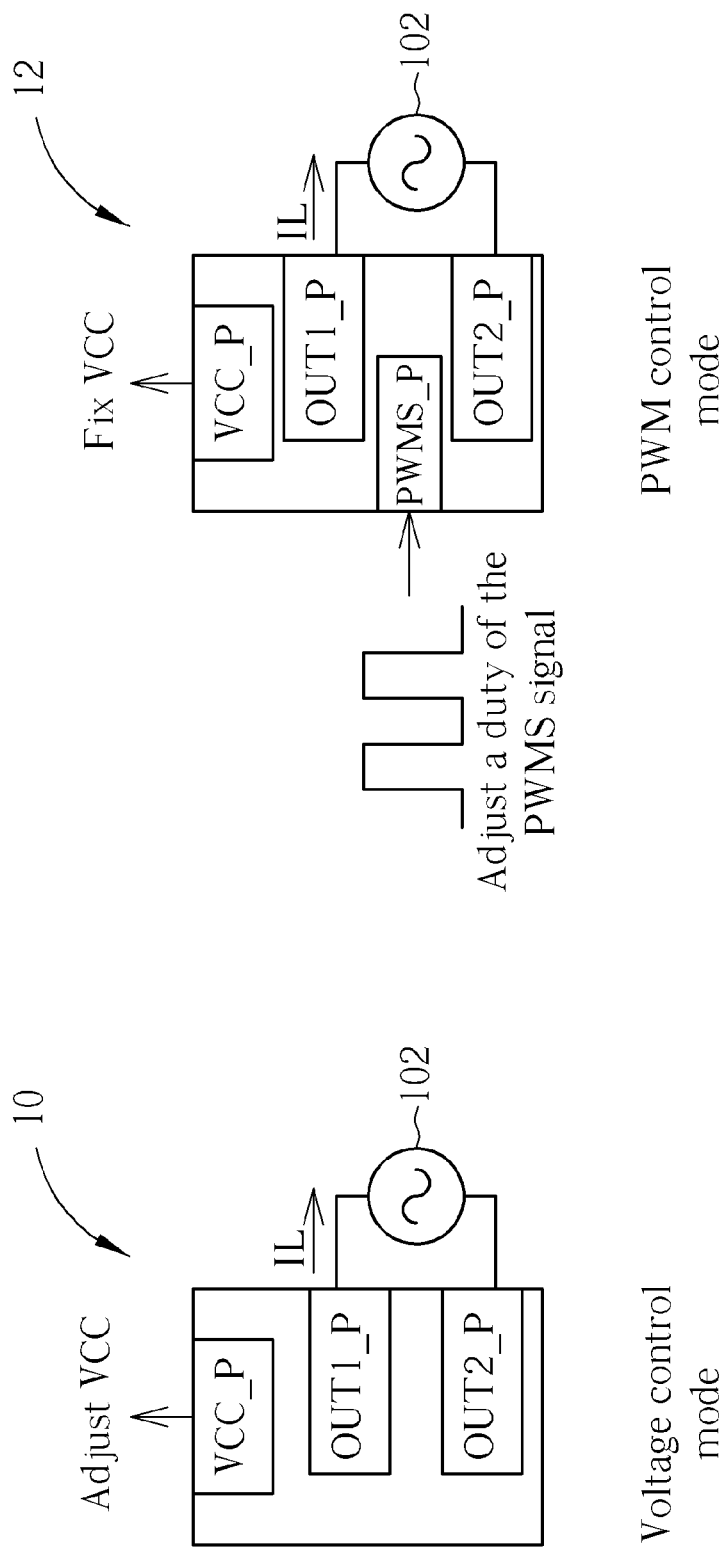

START-UP CIRCUIT AND MOTOR DRIVING IC

BACKGROUND OF THE INVENTION

1. Field of the Invention

The present invention relates to a start-up circuit and motor driving IC, and more particularly, to a start-up circuit and motor driving IC capable of determining an operating mode of the motor driving IC by itself without an enable pin, to adjust an activation signal to perform activation.

2. Description of the Prior Art

As the development of computer technology in recent years, the heat generated from a central processing unit (CPU) increases as the frequency of the CPU increases. Therefore, the need for heat-dissipation becomes important. The main method for heat-dissipation is still heat-dissipating fans. There are voltage control and pulse width modulation (PWM) control methods for motor driving ICs of heat-dissipating fans used in CPUs.

Please refer to FIG. 1A and FIG. 1B, which are schematic diagrams of conventional motor driving ICs 10 and 12 having a voltage control mode and a PWM control mode, respectively. Noticeably, the motor driving ICs 10 and 12 can be a same motor driving IC in practice as long as control modes of the motor driving IC are switched via adjusting input signals of a system voltage pin VCC_P and a PWM pin PWM_P.

In detail, as shown in FIG. 1A, for the voltage control mode of the motor driving IC 10, a driving current IL at the output pins OUT1_P and OUT2_P can be changed via adjusting a system voltage VCC at a system voltage pin VCC_P, so as to change rotation speeds of a motor 102 and the corresponding fan.

On the other hand, as shown in FIG. 1B, for the PWM control mode of the motor driving IC 12, the system voltage VCC at a system voltage pin VCC_P is fixed, and then the driving current IL outputted by the output pins OUT1_P and OUT2_P can be changed by adjusting the duty of a PWM signal PWMS at a PWM pin PWM_P, so as to change the rotation speeds of the motor 102 and the corresponding fan.

For example, please refer to FIG. 1C, which is a schematic diagram of a driving circuit 104 of the motor driving IC 12 shown in FIG. 1B. As shown in FIG. 1B, the motor driving IC 12 can utilize a PWM output signal PWMout, which is equivalent to the PWM signal PWMS, to control the on/off of an upper gate switch 106 and a lower gate switch 108 of the driving circuit 104, so as to change the driving current IL of the driving motor 102, and thus change the rotation speeds of the motor 102 and the corresponding fan as well. Noticeably, the motor driving IC 10 can also comprise the driving circuit 104 shown in FIG. 1C to drive the motor 102, where the motor driving IC 10 can be seen as the motor driving IC 12 with the PWM pin PWM_P not coupled to the PWM signal PWMS, i.e. floating, and thus a duty of the inputted PWM signal PWMS is equivalent to a full duty.

However, for the PWM driving IC 12, if the duty of the PWM signal PWMS is too small, and thus the generated driving current IL is too small to overcome the static friction, the motor 102 can not be activated. In such a situation, the conventional PWM driving IC 12 utilizes the PWM output signal PWMout with greater duty, e.g. a duty of 50%, to accordingly generate the greater driving current IL first, so as to activate the motor 102 compulsively. After the motor 102 starts rotating, the PWM driving IC 12 returns to utilize the PWM signal PWMS with lesser duty as the PWM output signal PWMout.

As a result, please refer to FIG. 1D, which is a schematic diagram of that the rotation speeds of the motor 102 shown in FIG. 1B with respect to different duty of the PWM signal PWMS whether the conventional compulsive activation mechanism is applied or not. As shown in FIG. 1D, without the compulsive activation mechanism, e.g. a duty of 50%, the motor 102 can be activated by the PWM signal PWMS with a duty about 20%. Oppositely, with the compulsive activation mechanism, the minimum duty to activate the motor 102 can be improved to be 10%.

In practice, the motor driving ICs 10 and 12 can be the same motor driving IC by means of adjusting input signals of a system voltage pin VCC_P and a PWM pin PWM_P to switch control modes of the motor driving IC. If the mentioned compulsive activation mechanism is built in the motor driving ICs 10 and 12, the motor driving IC 10 generates the driving current IL with the PWM output signal PWMout without a full duty, e.g. a duty of 50%, to activate the motor 102. As a result, under the circumstances that the motor driving IC 10 is operating in the voltage control mode and the system voltage VCC is at a low voltage level, the motor driving IC 10 may not be able to overcome the static friction to activate the motor 102.

In such a situation, please refer to FIG. 1E, which is a schematic diagram of a conventional motor driving IC 14 further comprising an enable pin EN. As shown in FIG. 1E, if a signal of the enable pin EN is at a low voltage level, the motor driving IC 14 does not perform the compulsive activation mechanism and thus the voltage control mode is adapted. If the signal of the enable pin EN is at a high voltage level, the motor driving IC 14 performs the compulsive activation mechanism and thus the PWM control mode is adapted.

However, since the pins of a general motor driving IC are limited, the conventional method of using the enable pin EN to control whether to enable the compulsive activation mechanism results in limited functions of the motor driving IC. Therefore, there is a need to improve the prior art.

SUMMARY OF THE INVENTION

It is therefore an objective to provide a start-up circuit and motor driving IC capable of determining an operating mode of the motor driving IC by itself without an enable pin, to adjust an activation signal to perform activation.

The present invention discloses a start-up circuit for a motor driving IC. The start-up circuit includes a determination unit for generating a determination result indicating an operating mode of the motor driving IC according to an external PWM signal, and an output unit for outputting an activation signal according to the determination result and a PWM activation signal, wherein a duty of the PWM activation signal is greater than that of the external PWM signal.

The present invention further discloses a motor driving IC for driving a fan. The motor driving IC includes a selector for selecting one of an external PWM signal and an activation signal as a PWM output signal according to a selection signal, and an activation circuit for generating the activation signal, the activation circuit includes a determination unit for generating a determination result indicating an operating mode of the motor driving IC according to the external PWM signal, and an output unit for outputting the activation signal according to the determination result and a PWM activation signal, wherein a duty of the PWM activation signal is greater than that of the external PWM signal.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1A and FIG. 1B are schematic diagrams of conventional motor driving ICs having a voltage control mode and a PWM control mode, respectively.

DETAILED DESCRIPTION

Figure 1C:
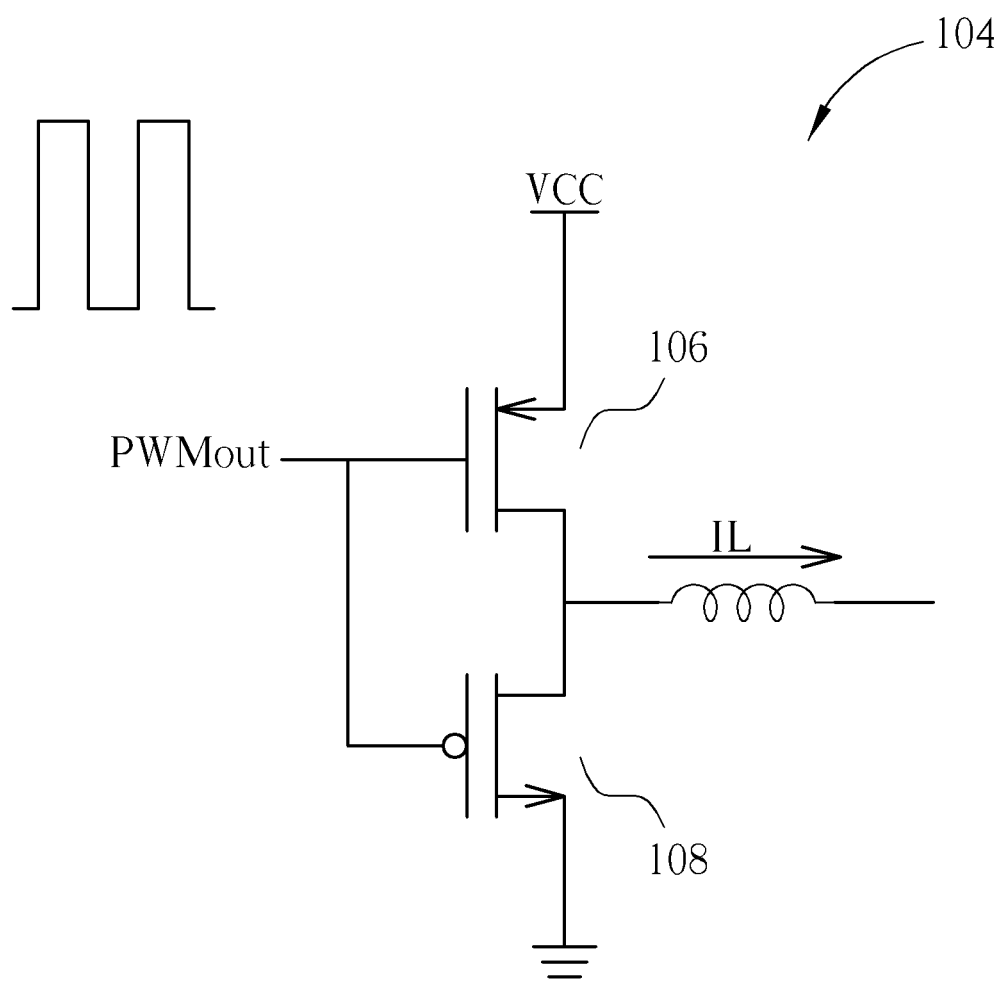
FIG. 1C is a schematic diagram of a driving circuit of the motor driving IC shown in FIG. 1B.
Figure 1D:
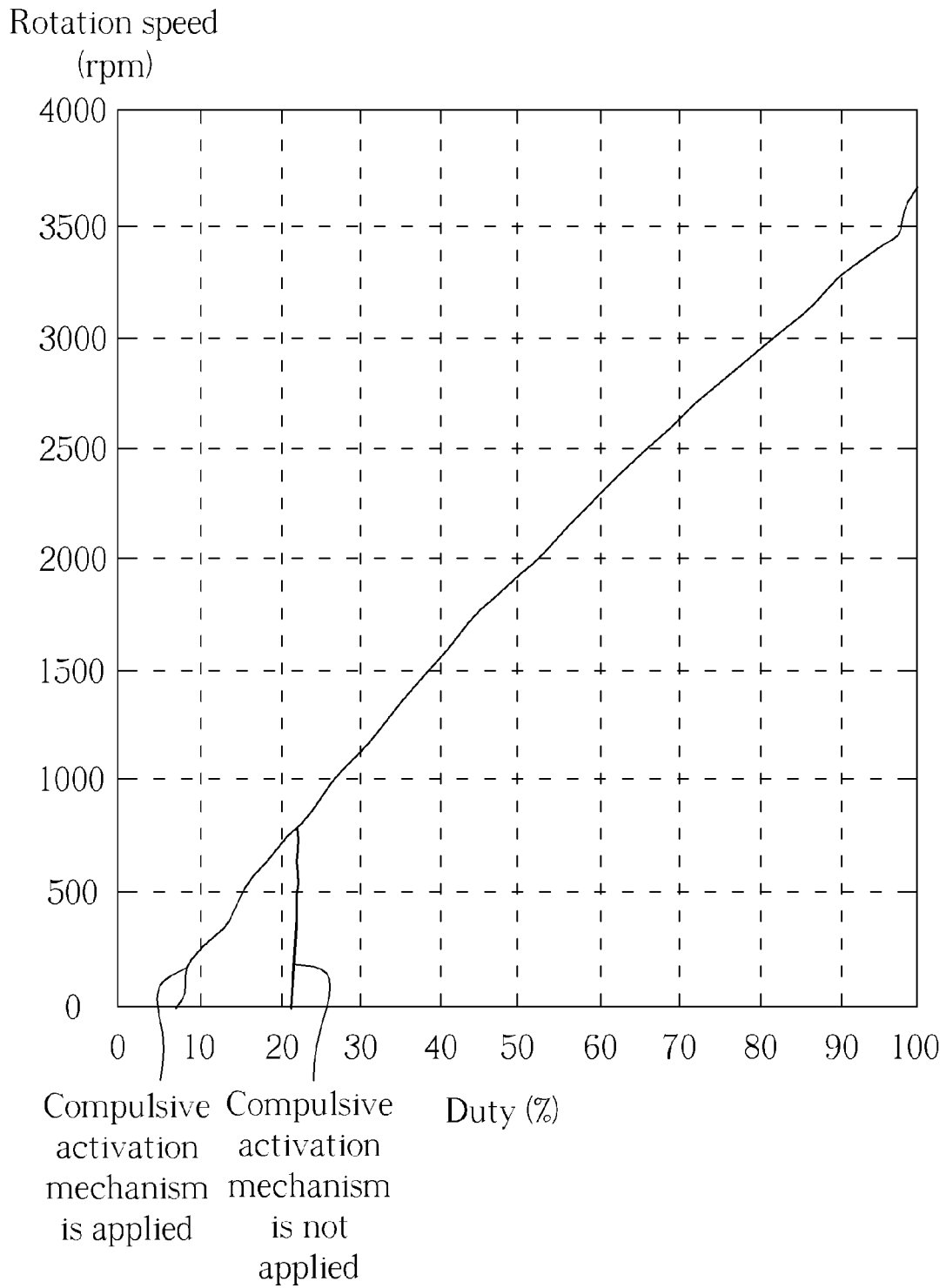
FIG. 1D, which is a schematic diagram illustrating that the rotation speeds of the motor 102 shown in FIG. 1B with respect to different duties of the PWM signal PWMS whether the conventional compulsive activation mechanism is applied or not.
Figure 1E:
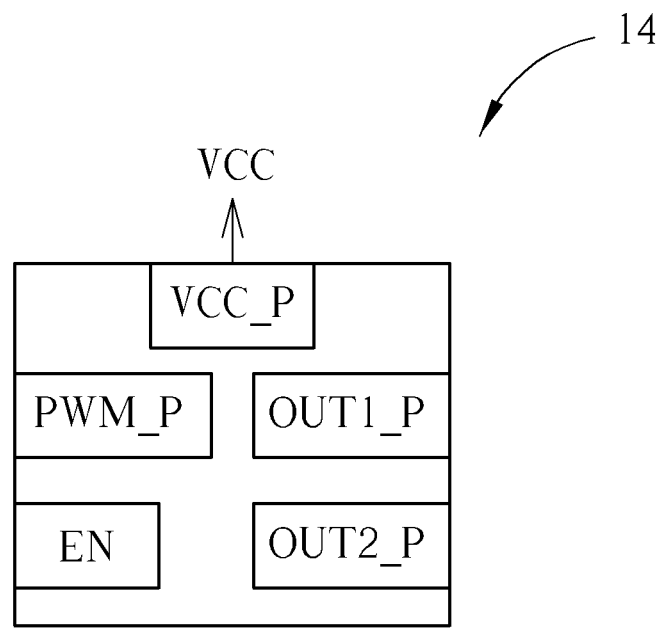
FIG. 1E, which is a schematic diagram illustrating a conventional motor driving IC further comprising an enable pin.
Figure 2A:
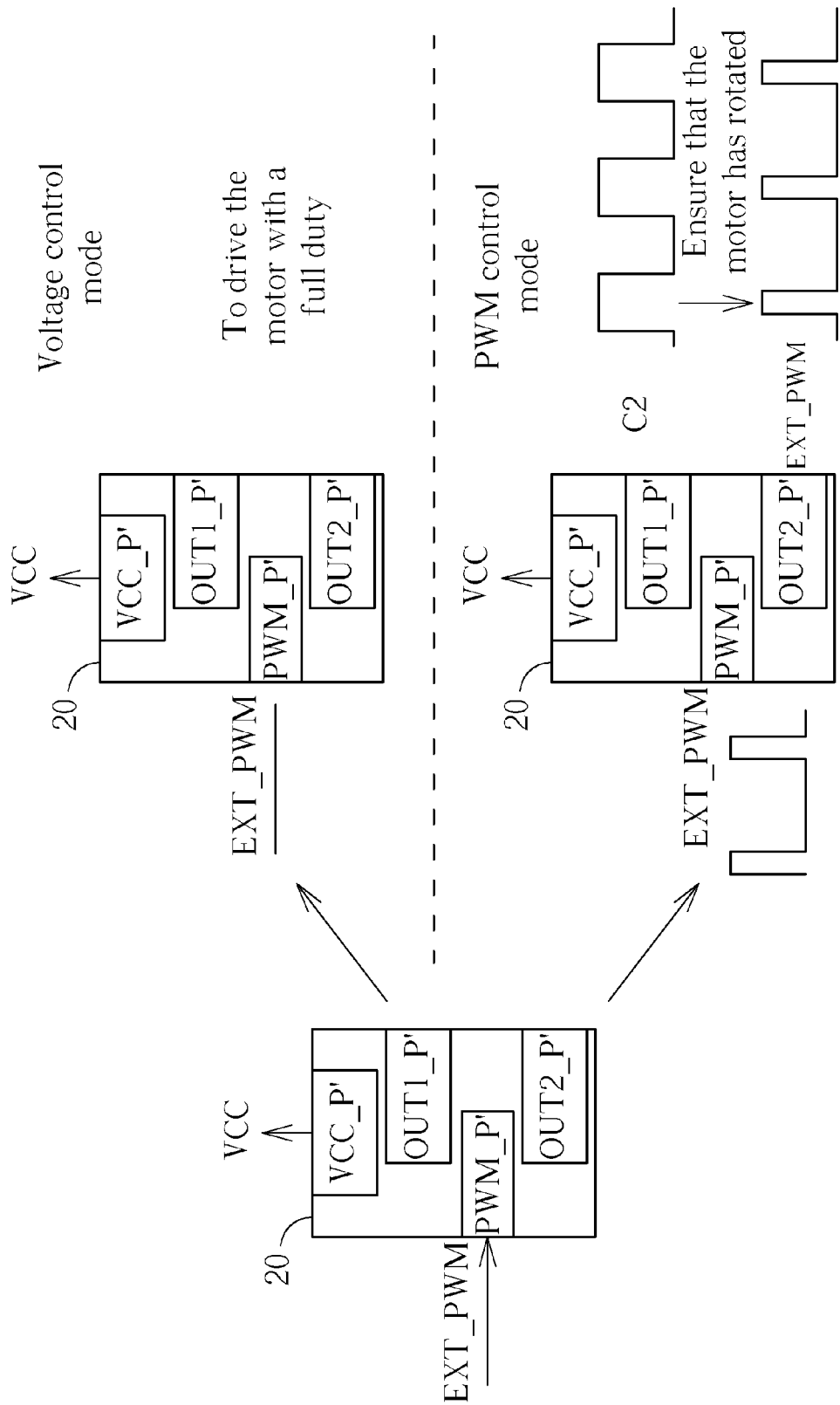
FIG. 2A is an operating diagram of a motor driving IC according to an embodiment of the present invention.

Please refer to FIG. 2A, which is a schematic diagram of operations of a motor driving IC 20 according to an embodiment of the present invention. As shown in FIG. 2A, the motor driving IC 20 includes a system voltage pin VCC_P', a PWM pin PWM_P' and output pins OUT1_P' and OUT2_P'. The main difference between the motor driving IC 20 and the motor driving IC 14 is that the motor driving IC 20 can determine an operating mode by itself according to a signal type of an external PWM signal EXT_PWM received at a PWM pin PWM_P', to decide whether to activate the compulsive activation mechanism, and thus the enable pin EN shown in FIG. 1E is not required to be set in the motor driving IC 20. Operations of the motor driving IC 20 about driving the motor can be referred to the driving circuit 104 shown in FIG. 1C.

For example, if the motor driving IC 20 determines the duty of the external PWM signal EXT_PWM is a full duty, the motor driving IC 20 determines the operating mode of the motor driving IC 20 is the voltage control mode, and thus does not activate the compulsive activation mechanism and still utilize the external PWM signal EXT_PWM with a full duty to drive the motor. If the motor driving IC 20 determines the external PWM signal EXT_PWM switches between different voltage levels, the motor driving IC 20 determines the operating mode of the motor driving IC 20 is the PWM control mode, and thus activates the compulsive activation mechanism and utilizes a PWM activation signal C2 with a greater duty, e.g. a duty of 50% greater than that of the external PWM signal EXT-PWM, to activate the motor. After ensuring that the motor has rotated, the motor driving IC 20 switches to utilize the external PWM signal EXT_PWM with less duty to drive the motor. As a result, the motor driving IC 20 can determine whether to activate the compulsive activation mechanism by itself according to the external PWM signal EXT_PWM, and thus the integrality can be increased without including the enable pin EN.

Figure 2B:
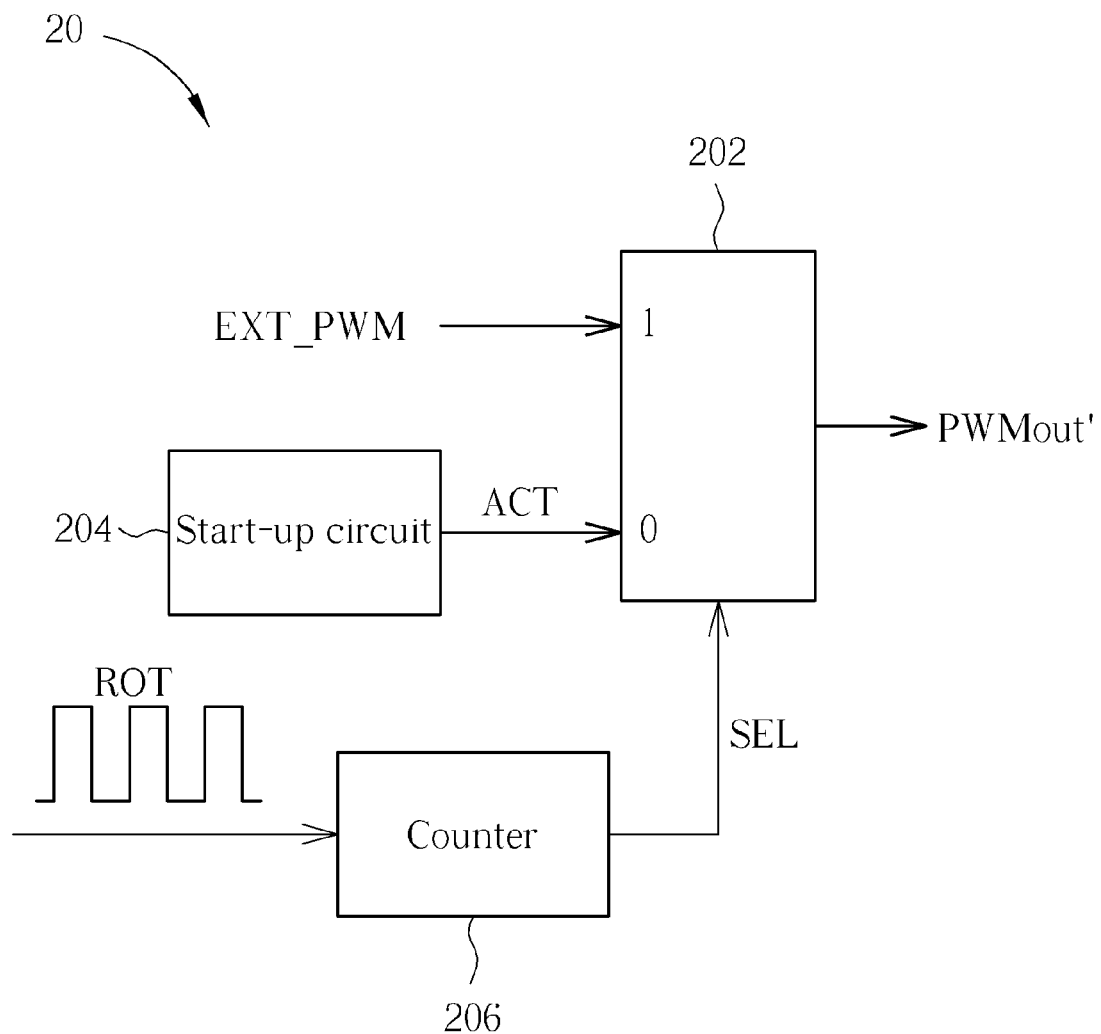
FIG. 2B is a block diagram of the motor driving IC shown in FIG. 2A.

Specifically, please refer to FIG. 2B, which is a block diagram of the motor driving IC 20 shown in FIG. 2A. As shown in FIG. 2B, the motor driving IC 20 includes a selector 202, a start-up circuit 204 and a counter 206. In short, the counter 206 counts switching times of the magnetic field when the motor drives the fan to be rotating according to a rotation signal ROT, so as to generate a selection signal SEL indicating whether the fan has rotated or not, e.g. the fan is determined to be rotating if counted 2 or 4 circles. The start-up circuit 204 generates an activation signal ACT. The selector 202 receives the external PWM signal EXT_PWM and the activation signal ACT, and then selects to output one of the external PWM signal EXT_PWM and the activation signal ACT as a PWM output signal PWMout' according to the selection signal SEL, and thus drive the motor by a driving circuit similar to the driving circuit 104 shown in FIG. 1C.

In such a situation, if the selection signal SEL indicates the fan has not rotated, the selector 202 outputs the activation signal ACT as the PWM output signal PWMout', i.e. activate the motor with the activation signal ACT. On the contrary, if the selection signal SEL indicates the fan has rotated, the selector 202 outputs the external PWM signal EXT_PWM as the PWM output signal PWMout', i.e. drive the motor with the external PWM signal EXT_PWM. As a result, the motor driving IC 20 can change the signal for driving the motor according to whether the fan has rotated or not, so as to activate the motor with the activation signal ACT when the fan has not rotated.

Figure 3:
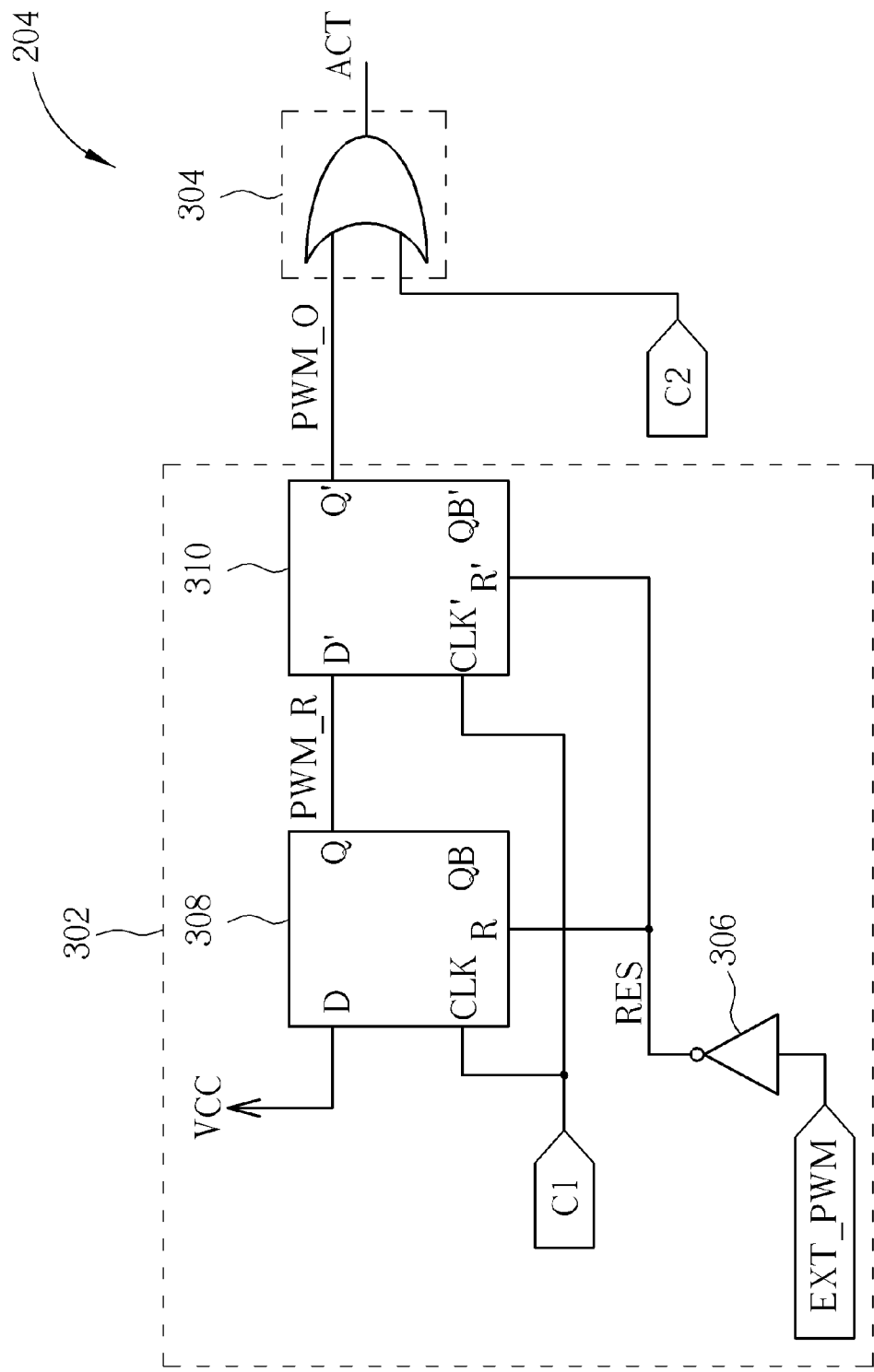
FIG. 3 is a schematic diagram of the start-up circuit shown in FIG. 2B.

Furthermore, please refer to FIG. 3, which is a schematic diagram of the start-up circuit 204 shown in FIG. 2B. As shown in FIG. 2C, the start-up circuit 204 includes a determination unit 302 and an output unit 304. The determination unit 302 generates a determination result PWM_O indicating the operating mode of the motor driving IC 20 according to the external PWM signal EXT_PWM, and the output unit 304 outputs the activation signal ACT according to the determination result PWM_O and the PWM activation signal C2. A duty of the PWM activation signal C2 is greater than that of the external PWM signal EXT_PWM.

In such a condition, if the determination result PWM_O indicates the operating mode of the motor driving IC 20 is the voltage control mode, the output unit 304 outputs the activation signal ACT with a full duty. If the determination result PWM_O indicates the operating mode of the motor driving IC 20 is the PWM control mode, the output unit 304 outputs the PWM activation signal C2 as the activation signal ACT. As a result, the output unit 304 can output the appropriate activation signal ACT to activate the motor by itself when the motor driving IC 20 operates in different modes, and thus the motor driving IC 20 can overcome the static friction without including the enable pin EN.

In detail, the output unit 304 can be an OR gate, for outputting the activation signal ACT according to the determination result PWM_O and the PWM activation signal C2. The determination unit 302 can include an inverter 306 and flip-flops 308 and 310. The inverter 306 receives the external PWM signal EXT_PWM to generate a reset signal RES. The flip-flops 308 and 310 are coupled in series, for outputting the determination result PWM_O according to the system voltage VCC, a control clock C1 and the reset signal RES. The flip-flops 308 and 310 include input terminals D and D', clock terminals CLK and CLK', reset terminals R and R', output terminals Q and Q' and terminals QB and QB', respectively. The input terminal D, the clock terminal CLK and the reset terminal R of the flip-flop 308 can be utilized for receiving the system voltage VCC, the control clock C1 and the reset signal RES, respectively. And the output terminal Q can be utilized for outputting an output signal PWM_R. And the input terminal D', the clock terminal CLK' and the reset terminal R' of the flip-flop 310 can be utilized for receiving the output signal PWM_R, the control clock C1 and the reset signal RES, respectively. And the output terminal Q' can be utilized for outputting the determination result PWM_O.

Figure 4A:
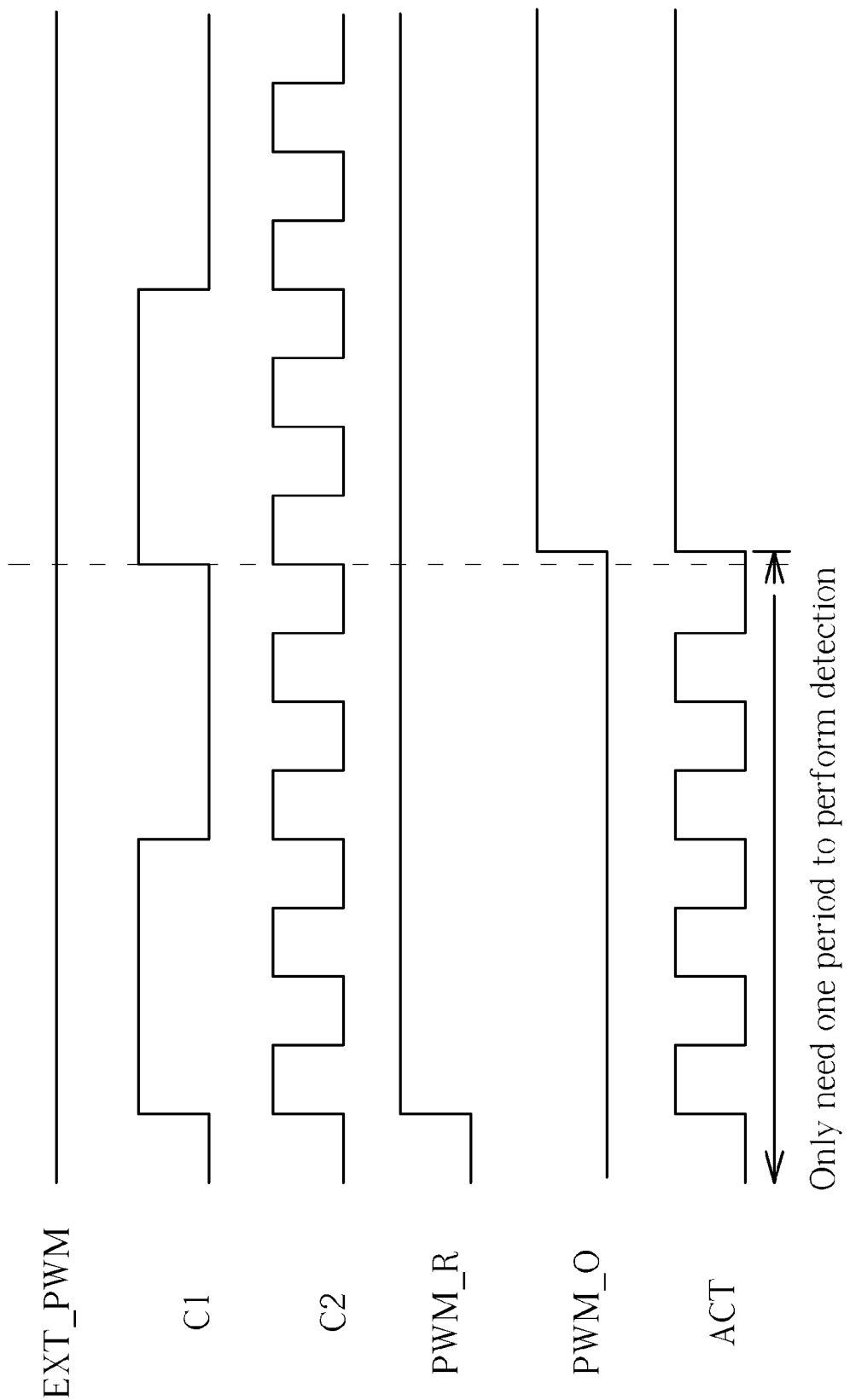
FIG. 4A and FIG. 4B are schematic diagrams illustrating that the external PWM signal, the control clock, the PWM activation signal, the output signal, the determination result and the activation signal when the operating mode of the motor driving IC shown in FIG. 2B is the voltage control mode and the PWM control mode, respectively.
Figure 4B:
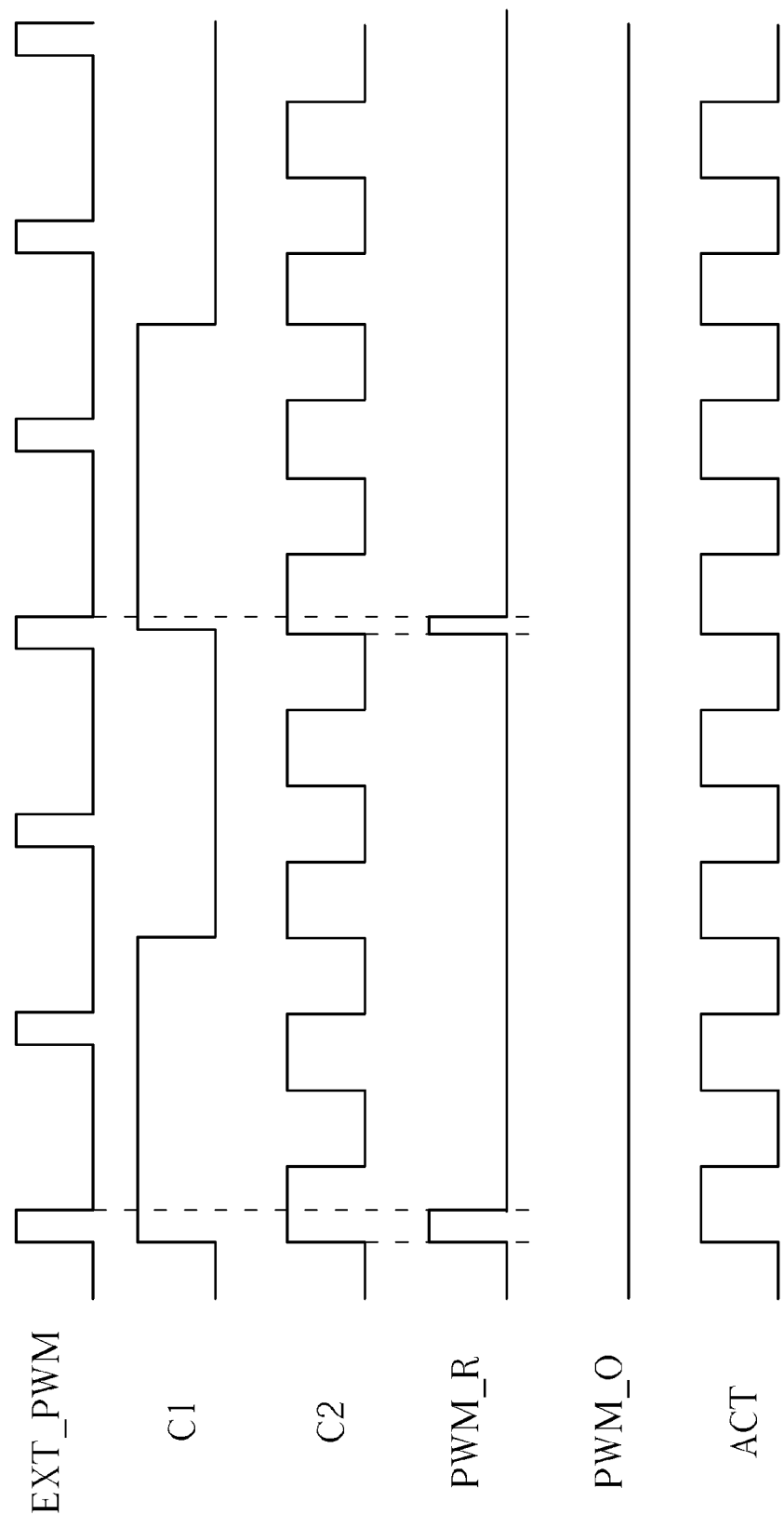

In such an configuration, please refer to FIG. 4A and FIG. 4B, which are schematic diagrams of the external PWM signal EXT_PWM, the control clock C1, the PWM activation signal C2, the output signal PWM_R, the determination result PWM_O and the activation signal ACT when the operating modes of the motor driving IC 20 shown in FIG. 2B are the voltage control mode and the PWM control mode, respectively.

As shown in FIG. 4A, when the motor driving IC 20 operates in the voltage control mode, the external PWM signal EXT_PWM has a full duty, i.e. the external PWM signal EXT_PWM is always at a high voltage level, so that the reset signal RES is at a low voltage level and thus the flip-flops 308 and 310 are not reset. In such a condition, since the flip-flops 308 and 310 switch the output signal PWM_R and the determination result PWM_O to the levels of the system voltage VCC and the output signal PWM_R during a rising edge the control clock C1 is at a high voltage level, respectively, and therefore the output signal PWM_R is switched to the voltage level of the system voltage VCC during the first rising edge of the control clock C1, and then the determination result PWM_O is switched to the high voltage level of the output signal PWM_R during the second rising edge of the control clock C1, wherein the flip-flops 308 and 310 are not reset within an interval of the two rising edges. Subsequently, the output unit 304 can switch from outputting the originated PWM activation signal C2 as the activation signal ACT to outputting the activation signal ACT with a full duty as the activation signal ACT when the output signal PWM_R is switched to a high voltage level. As a result, during the voltage control mode, the determination unit 302 only needs one period of the control clock C1 to perform detection, e.g. the detection only needs 125 microsecond if the frequency of the control clock C1 is 8 KHz, so as to generate the determination result PWM_O indicating that the motor driving IC 20 operates in the voltage control mode, and thus the output unit 304 can output the activation signal ACT with a full duty.

On the other hand, as shown in FIG. 4B, when the motor driving IC 20 operates in PWM control mode, the external PWM signal EXT_PWM performs switching between high/low voltage levels according to its duty, therefore if the external PWM signal EXT_PWM is at a low voltage level, the reset signal RES is at a high voltage level, and thus the flip-flops 308 and 310 reset the output signal PWM_R and the determination result PWM_O to low voltage levels, respectively. In such a situation, since the flip-flops 308 and 310 switch the output signal PWM_R and the determination result PWM_O to the levels of the system voltage VCC and the output signal PWM_R during the rising edge the control clock C1 is at high voltage level, respectively, and thus the output signal PWM_R is switched to a high voltage level of the system voltage VCC when the first rising edge of the control clock C1 and thus the external PWM signal EXT_PWM is at a high voltage level and the flip-flop 308 does not perform resetting to the output signal PWM_R. Subsequently, if the external PWM signal EXT_PWM switches to low voltage level based on its duty, the flip-flop 308 resets the output signal PWM_R to a low voltage level, such that the output signal PWM_R is still at a low voltage level during the second rising edge of the control clock C1, and thus the determination result PWM_O is at a low voltage level of the output signal PWM_R as well.

Therefore, since the external PWM signal EXT_PWM switches between high/low voltage levels within one period of the control clock C1, though the output signal PWM_R is switched to a high voltage level of the system voltage VCC during the first rising edge, the reset signal RES controls the output signal PWM_R to switch to a low voltage level before the second rising edge of the control clock C1, so that the determination result PWM_O is always at a low voltage level, and thus the output unit 304 always outputs the PWM activation signal C2 as the activation signal ACT. As a result, the output unit 304 can always output the PWM activation signal C2 with the greater duty as the activation signal ACT to activate the motor compulsively during the PWM control mode.

Noticeably, the spirit of the present invention is that the motor driving IC 20 can determine the operating mode of the motor driving IC 20, so as to decide whether to activate the compulsive activation mechanism according to the signal type of the received external PWM signal EXT_PWM, and thus the enable pin EN shown in FIG. 1E is not required to be set in the motor driving IC 20. Those skilled in the art should make modifications or alterations accordingly. For example, realizations of the circuits of the determination unit 302 and the output unit 304 are not limited to the circuits shown in FIG. 3, as long as the functions of determining the operating mode of the motor driving IC 20 and switching the activation signal ACT can be achieved, respectively. For example, there are two flip-flops 308 and 310 included in the determination unit 302 shown in FIG. 3, but the number of the flip-flops is not limited, as long as the switching of the external PWM signal EXT_PWM can be determined. Besides, the frequency of the control clock C1 is preferably less than the operating range of the external PWM signal EXT_PWM, e.g. 8 KHz is less than the operating range 10 KHz, to ensure the detection time is greater than the period of the external PWM signal EXT_PWM. In addition, the frequency of the PWM activation signal C2 can be 33 KHz and have a duty of 50% as the compulsive activation signal, but is not limited to this.

In the prior art, the method of utilizing the enable pin EN to control whether to enable the compulsive activation mechanism results in the limited functions of the motor driving IC due to the limited pins of general motor driving ICs. In comparison, the motor driving IC 20 of the present invention can determine the operating mode of the motor driving IC 20 by itself according to the external PWM signal EXT_PWM, and does not activate the compulsive activation mechanism if the operating mode of the motor driving IC 20 is determined to be the voltage control mode while activating the compulsive activation mechanism if the operating mode of the motor driving IC 20 is determined to be the PWM control mode, such that the integrality of the motor driving IC 20 can be increased without including the enable pin EN.

To sum up, the present invention can determine the operating mode of the motor driving IC by itself to adjust an activation signal and perform activation without including an enable pin.

Those skilled in the art will readily observe that numerous modifications and alterations of the device and method may be made while retaining the teachings of the invention.

What is claimed is:
1. A start-up circuit for a motor driving IC, comprising:
a determination unit for generating a determination result indicating an operating mode of the motor driving IC according to an external pulse width modulation, named PWM hereinafter, signal; and an output unit for outputting an activation signal according to the determination result and a PWM activation signal;

wherein a duty of the PWM activation signal is greater than that of the external PWM signal.

2. The start-up circuit of claim 1, wherein the output unit outputs the activation signal with a full duty if the determination result indicates the operating mode of the motor driving IC is a voltage control mode.

3. The start-up circuit of claim 1, wherein the output unit outputs the PWM activation signal as the activation signal if the determination result indicates the operating mode of the motor driving IC is a PWM control mode.

4. The start-up circuit of claim 1, wherein the determination unit comprises:

an inverter for receiving the external PWM signal to generate a reset signal; and a plurality of flip-flops, coupled with each other in series, for outputting the determination result according to a system voltage, a control clock and the reset signal.

5. The start-up circuit of claim 1, wherein the plurality of flip-flops comprises:

a first flip-flop comprising an input terminal, a clock terminal and a reset terminal, for receiving the system voltage, the control clock and the reset signal, respectively, and an output terminal for outputting a first output signal; and a second flip-flop comprising an input terminal, a clock terminal and a reset terminal, for receiving the first output signal, the control clock and the reset signal, respectively, and an output terminal for outputting the determination result.

6. The start-up circuit of claim 5, wherein the first flip-flop and the second flip-flop switch the first output signal and the determination result to levels of the system voltage and the first output signal during a rising edge the control clock is at a high voltage level, respectively; if the reset signal indicates to reset, the first flip-flop and the second flip-flop reset the first output signal and the determination result, respectively.

7. The start-up circuit of claim 1, wherein the output unit comprises an OR gate for outputting the activation signal according to the determination result and the PWM activation signal.

8. A motor driving IC for driving a fan, comprising:

a selector for selecting one of an external pulse width modulation, named PWM hereinafter, signal and an activation signal as a PWM output signal according to a selection signal; and an activation circuit for generating the activation signal, the activation circuit comprises:

a determination unit for generating a determination result indicating an operating mode of the motor driving IC according to the external PWM signal; and an output unit for outputting the activation signal according to the determination result and a PWM activation signal;

wherein, a duty of the PWM activation signal is greater than that of the external PWM signal.

9. The motor driving IC of claim 8, wherein the selector outputs the activation signal as the PWM output signal if the selection signal indicates the fan has not rotated.

10. The motor driving IC of claim 8, wherein the selector outputs the external PWM signal as the PWM output signal if the selection signal indicates the fan has rotated.

11. The motor driving IC of claim 8, wherein the output unit outputs the activation signal with a full duty if the determination result indicates the operating mode of the motor driving IC is a voltage control mode.

12. The motor driving IC of claim 8, wherein the output unit outputs the PWM activation signal as the activation signal if the determination result indicates the operating mode of the motor driving IC is a PWM control mode.

13. The motor driving IC of claim 8, wherein the determination unit comprises:

an inverter for receiving the external PWM signal to generate a reset signal; and a plurality of flip-flops coupled in series for outputting a determination result according to a system voltage, a control clock and the reset signal.

14. The motor driving IC of claim 12, wherein the plurality of flip-flops comprise:

a first flip-flop having an input terminal, a clock terminal and a reset terminal for receiving the system voltage, the control clock and the reset signal, respectively, and an output terminal for outputting a first output signal; and a second flip-flop having an input terminal, a clock terminal and a reset terminal for receiving the first output signal, the control clock and the reset signal, respectively, and an output terminal for outputting the determination result.

15. The motor driving IC of claim 14, wherein the first flip-flop and the second flip-flop switch the first output signal and the determination result to levels of the system voltage and the first output signal during a rising edge the control clock is at a high voltage level, respectively; if the reset signal indicates to reset, the first flip-flop and the second flip-flop reset the first output signal and the determination result, respectively.

16. The motor driving IC of claim 8, wherein the output unit comprises an OR gate for outputting the activation signal according to the determination result and the PWM activation signal.

* * * * *